United States Patent [19]  
Chiang et al.

[11] 3,750,735  
[45] Aug. 7, 1973

[54] REMOVAL OF WATER FROM LIQUID MIXTURES CONTAINING FORMALDEHYDE USING A POROUS POLYMERIC MEMBRANE

[75] Inventors: Robert Chiang; Eli Perry, both of St. Louis, Mo.

[73] Assignee: Monsanto Company, St. Louis, Mo.

[22] Filed: Jan. 19, 1972

[21] Appl. No.: 219,155

Related U.S. Application Data

[62] Division of Ser. No. 46,800, June 16, 1970, abandoned.

[52] U.S. Cl............ 159/49, 159/DIG. 27, 203/89, 260/79.3 M, 210/23
[51] Int. Cl...... B01d 1/22, B01d 3/00, B01d 13/00, C08f 15/12
[58] Field of Search................ 210/22, 23; 159/DIG. 27; 203/89, 17; 260/79.3 M

[56] References Cited
UNITED STATES PATENTS
2,953,502  9/1960  Binning et al.................. 210/23 X
2,981,680  4/1961  Binning............................... 210/23
3,062,737  11/1962  Azorlosa et al...................... 210/22
3,132,094  5/1964  McKelvey, Jr. et al.............. 210/23
3,216,930  11/1965  Glew.................................... 210/22
3,228,876  1/1966  Mahon................................. 210/22
3,228,877  1/1966  Mahon................................. 210/22
3,608,610  9/1971  Greatorex.................... 159/DIG. 27

Primary Examiner—Norman Yudkoff
Assistant Examiner—J. Sofer
Attorney—Herman O. Bauermeister et al.

[57] ABSTRACT

Process for the separation of water from mixtures of water and organic or inorganic compounds, soluble in water, by contacting the mixtures against a nitrogen-containing polymeric membrane, and withdrawing at the other side of the membrane a mixture having a higher concentration of water.

6 Claims, No Drawings

REMOVAL OF WATER FROM LIQUID MIXTURES CONTAINING FORMALDEHYDE USING A POROUS POLYMERIC MEMBRANE

This is a division of application Ser. No. 46,800, filed June 16, 1970, now abandoned.

The present invention relates to the separation of components, one of which is water, such as formaldehyde and water, in order to obtain a more highly concentrated solution by removing at least a portion of the water from the feed solution. In general the feed solutions are composed of organic compounds soluble in water, or inorganic compounds soluble in water.

The feed solutions may also contain additional components, e.g., methanol with formaldehyde-water, or sodium chloride with hydrochloric acid-water, or butanol in ethanol-water systems.

Essentially the present process comprises contacting the feed mixture against one side of a membrane, and withdrawing at the second side a mixture having a higher concentration of water than the aforesaid feed mixture. It is also essential that the mixture at the second side be maintained at a lower chemical potential than the feed side. It is also essential that the product be withdrawn at the second side in the vapor state. In the commercial utilization of the present process multi-state operation may also be feasible since this permits the operation of individual stages at various concentrations and temperatures in order to achieve the optimum driving forces for the process.

For each individual stage the effectiveness of the separation is shown by the separation factor (S.F.).

The separation factor (S.F.) is defined as the ratio of the concentrations of the two substances A and B to be separated divided into the ratio of the concentations of the corresponding substances in the permeate S.F. $= (c_A/c_B)$ in permeate/$(c_A/c_B)$ in permeant where $c_A$ and $c_B$ are the concentrations of water and formaldehyde (HNO₃, HCL or ethanol), respectively.

In a preferred embodiment of the invention the first or feed side of the membrane is under a positive pressure, while the second side is under a negative pressure, relative to atmospheric pressure. Still more preferably the second side is maintained at a pressure differential which is greater than 0.01 atmosphere, or preferably with a differential of from 0.1 to 0.5 atmosphere. Another preferred mode of operation is with the second side maintained at a vacuum of from 0.2 mm. to 759 mm. Hg.

At least one of the components to be separated is characterized by pronounced hydrogen bonding. Thus water is the major component or solvent although other compounds such as alcohols, esters and organic acids may be the solvent phase in the liquid or vapor feed.

The additional component which is generally to be concentrated by preferentially removing the water or other solvent from azeotropic and non-azeotropic systems include as typical:

| | | |
|---|---|---|
| benzene | aniline | ethyl vinyl ether |
| butanol | 2-ethylhexanol | p-dioxane |
| acetic acid | hydrogen peroxide | methyl propionate |
| formic acid | hydrazine | pyridine |
| picoline | nitromethane | ethyl acrylate |
| methyl fumarate | acrolein | vinyl pripionate |
| cyclohexanol | propionaldehyde | ethyl propionate |
| triethylamine | 1,3-dioxiolane | picoline |
| triethanolamine | methacrylonitrile | cyclohexanone |
| hydrofluoric acid | crotonaldehyde | butyl vinyl ether |
| isopropanol | vinyl acetate | cyclohexylamine |
| n-propanol | butyronitrile | hexyl alcohol |
| hydrocyanic acid | | hexylamine |
| carbon tetrachloride | | butyl acetate |
| carbon disulfide | | isooctyl alcohol |
| chlorofrom | | dibutylamine |
| trichlorethylene | | decyl alcohols |
| acetonitrile | | propionitrile |
| chloroethanol | | propyl acetate |
| acrylonitrole | | amyl alcohol |
| allyl alcohol | | amyl acetate |
| propionic acid | | |
| methyl acetate | | |
| methyl acrulate | | |
| butanone | | |
| isobutyraldehyde | | |
| butyric acid | | |
| ethyl acetate | | |
| isopropyl ether | | |
| ethyl ether | | |
| butyl ether | | |
| furaldehyde | | |
| furfuryl alcohol | | |
| furfurylamine | | |
| methyl methacrylate | | |
| pentanone | | |
| ethyl carbonate | | |
| piperidine | | |
| phenol | | |

The term "chemical potential" is employed herein as described by Olaf A. Hougen & K. M. Watson ("Chemical Process Principles, Part II," John Wiley, N.Y., 1947). It is related to the escaping tendency of a substance from any particular phase. For an ideal vapor or gas this escaping tendency is equal to the partial pressure so that it varies greatly with changes in the total pressure. For a liquid the change in escaping tendency as a function of total pressure is small. The escaping tendency always depends upon the temperature and concentration. In the invention described herein, the feed substance is usually a liquid solution, and the other side of the membrane is maintained such that a vapor phase exists. A vapor feed is especially advantageous when the mixture to be separated is available in that form from an industrial process or when heat economies are to be effected in a multistage process.

The feed side may be at pressures less than atmospheric, or greater than atmospheric, and also at pressures over and above the vapor pressure of the liquid components (e.g., the flowing gaseous phase when a nitrogen, helium or other gaseous atmosphere is employed). The collection or permeate vapor side of the membrane may be at less than, or greater than, atmospheric pressure. The total pressure on the feed side is preferably between 0 psi absolute and 5,000 psig, preferably between 0 psi absolute and 1,000 psig. The vapor or collection side is maintained at a total pressure of 0 psi abs. to 1,000 psig, preferably between 0 psia and 500 psig. The conditions are always such as to maintain a higher chemical potential on the feed side than on the collection or vapor side, as defined above.

The liquid-vapor permeation as described above takes place through a permeable membrane. This membrane may be a simple disk or sheet of the membrane substance, which is suitably mounted in a duct or pipe, or mounted in plate and frame filter presses. However other forms of membrane may also be employed such as hollow tubes and fibers through which or around which the feed is supplied or is recirculated, with the product being removed at the other surface of the tubes as a vapor. Various other shapes and sizes are readily adaptable to commercial installations.

The process of the invention accomplishes the separation of the components of mixtures one of whose components is water, by the removal of the water component through a permeable membrane with the water in a higher concentration than in the feed being removed from one side of the membrane as a vapor, and with the imposition of a state of lower chemical potential on such collection side of the membrane. Thus a formaldehyde-water solution may be applied at atmospheric pressure to one side of a flat diaphragm of polyvinyl butyral, or other polymer, to accomplish a removal of at least a part of the water, leaving a more highly concentrated formaldehyde solution at the feed side of the membrane or diaphragm. Another advantage of the present process is that it can produce less formic acid during the concentration of formaldehyde solution than does the conventional distillation process. In one preferred embodiment of the invention the membrane is a synthetic organic polymeric substance characterized by the presence of anionic groups within the polymer. The anionic groups may also be active acidic groups within the polymer, for example sulfonic acid groups.

As an example of a stage of lower chemical potential on the collection or downstream side of the membrane, a vacuum may be maintained on the collection side, e.g., from 0.1 mm. to the vapor pressure of water in the feed solution at the membrane, at the respective temperature, as long as the vapor phase is present on the downstream side. A preferred range of vacuum is from 0.2 mm. to 759 mm. Hg.

In the formaldehyde-water system referred to above, the water selectively passes through the permeable membrane with the water-rich composition being rapidly removed as a vapor from the collection side of the membrane.

In contrast to the present invention, the employment of a liquid phase on each side of the membrane in seeking to accomplish significant separation is impractical because the applied pressure, has been found to be prohibitively high, e.g., up to 1000 atmospheres being necessary because of osmotic pressure. The liquid-liquid permeation is largely an equilibrium phenomenon, unless the osmotic forces are overcome, while in contrast, the liquid-vapor or vapor-vapor permeation of the present invention is a rate process, even at moderate conditions, in which the vapor is removed as soon as it reaches the collection surface of the membrane. Consequently it is found that a comparison of the effectiveness between liquid-liquid permeation, and the present liquid-vapor or vapor-vapor permeation for separation processes involves a significant superiority for the present method.

The present invention is of particular utility, with liquid feed stocks, including normally liquifiable feeds such as propylene, and is less useful for the separation of fixed gases such as hydrogen, nitrogen, helium and methane. These fixed gases have appreciably lower solubility in polymers than do liquids and saturated vapors, with the resultant lower rates of permeation.

It has been found that very effective membranes are composed of organic polymers having active anionic groups derived from strong acids. Preferred anionic or acidic moieties or end groups include sulfonic ($-SO_3^-$), phosphonic ($-PO_3^=$), phosphinic ($-HO_2P^-$), arsenic ($-AsO_3^-$), for example, and selenonic ($-SeO_3^-$), and telluric ($-TeO_3^-$) in their various valence forms. Suitable organic anionic groups include:

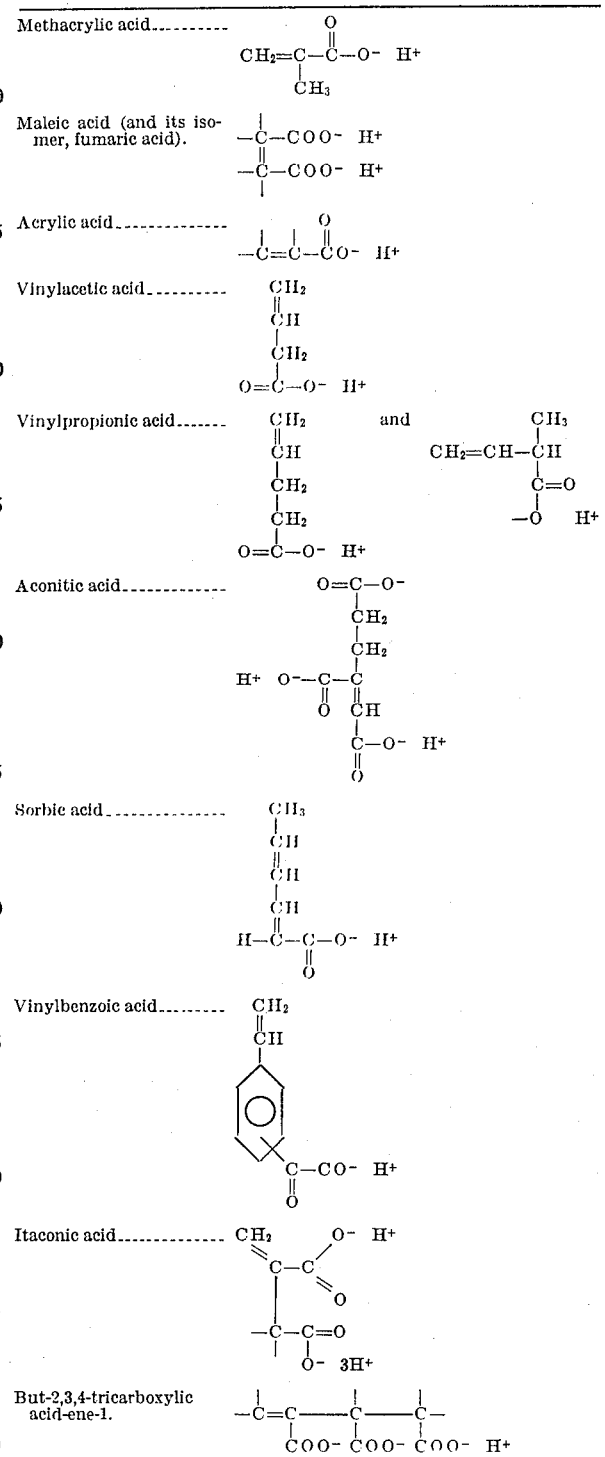

The membranes containing anionic groups may contain a formal negative charge such that a counterion (cation) may be present. This cation may be monovalent or multivalent, e.g., $H^+$, $Na^+$, $K^+$, $Mg^{++}$, $Al^{+++}$ or $R_4N^+$. A wide variety of cations are useful even though the exact value of the separation factor is dependent on the specific cation used. While not bound by theory we believe that the effect of the counterior is two-fold: (1) its effect on the membrane morphology and structure and (2) its effect on the ability of the anion to bond water and the binding of water by the cation itself. When a particular cation is preferred, e.g., to maintain the pH level, this cation can be preserved in the membrane by the addition of small quantities of salts in the feed, (e.g. NaCl). In general the polymers can be used as the acid form or as the various salts, and derivatives such as the esters.

The polymeric compositions having the aforesaid anionic groups in the polymer may be various homopolymers and copolymers or multicomponent mixtures of homopolymers and copolymers, such as acrylonitrile and copolymers such as acrylonitrile-acrylic acid, acrylonitrile-vinyl acetate, or acrylonitrile-vinyl alcohol styrene-acrylonitrile, acrylonitrile-vinyl halide, particularly acrylonitrile-isoprene, acrylonitrile-isobutylene, acrylonitrile-butadiene, acrylonitrile-ethyl vinyl ether or mixtures of polymers with copolymers of maleic anhydride / vinyl acetate; polyolefins such as polyethylene, fluorine-containing polymers, polyvinylidene fluoride, polychlorotrifluoroethylene, polyvinyl fluoride, polyfluoroethylene, polyvinyl chloride, polyvinylidene chloride, polystyrene and copolymers; and polyacetal and acetal containing polymer (polyvinyl butyral), methacrylonitrile and copolymers, such as methacrylonitrile-vinyl halides and other copolymers of methacrylonitrile, e.g., methacrylonitrile-styrene, substituted cellulose as the cyanoethylated and related products such as the ethers, polyvinyl ethers such as methyl vinyl ether maleic anhydride, polyesters, polyacrylate or methacrylate, polyurethanes, and linear epoxy polymer from bis-phenol-A and epichlorohydrin.

Other polymers include thermosetting materials and polyethers (e.g., polypropylene oxide), furane resins. phenolic and cresyllic, aromatic polyesters (e.g., polyethylene terephthalate), poly(phenylene oxide), silicon-containing resins, polycarbonate resins, epoxy resins, poly(allylic) resins, and polyketones, e.g., poly(methylvinylketone).

Other carrier resins for anionic-containing groups include benzimidazole resins, polyimide resins (the imide is within the chain or pendent to the chain—e.g., maleimide), aromatic amides, imines, poly(sulfone) type resins, aminostyrenes, N-containing resins (e.g., urea, melamine and triazole), hydrazides such as reaction products from (hydrazine, m-phenylene-diamine and terephthalyl chloride) or the resin from (isophthalolyl chloride, terephthaloyl chloride, hydrazine), or resins such as poly-N-acylhydrazines, urea adducts (e.g. urea with polyesters), poly(vinylpyridine), N-substituted aromatics, and polypeptides (synthetic and natural).

Many polymers are also useful by themselves (e.g., without specifically building in groups) since they contain their own groups which are sufficiently anionic in character. Examples of such polymers include polyvinyl chloride, chlorinated polyvinyl chloride, polyvinylidene chloride, polyvinyl fluoride, acrylonitrile-vinyl acetate copolymer, polyvinyl butylral, and cyanoethylated cellulose. The effective groups can be contained or introduced into polymers in a variety of ways, for example, grafting, formation of block polymers or via Diels-Alder reactions. The polymers may be rubbery or stiff. Single or multilayered films can be used.

It has also been found that improved permeation can occur if the polymeric membrane is heat treated. In general heating the film dry or wet at a temperature of from 50°C to 400°C, (if dry, preferably in a nitrogen atmosphere) improves the separative properties.

Another important control over the separation capacity of the membranes is exercised by the method used to form and solidify the membrane (e.g., casting from a melt into controlled atmospheres or from solution into baths at various concentrations and temperature).

The polymeric substances preferably have the anions of acids present in the polymer chain. The preferred anions are those of strong acids, as indicated by the pK values of the acid moiety, e.g., $H_3PO_4 \rightleftharpoons H^+ + H_2PO_4^-$ $_{(pK=2.12)}$. In a preferred embodiment of the invention the pK value is from 0.1 to 5 for at least one of the dissociating groups, and still more preferably 0.1 to 3.

The anionic groups may be incorporated into the polymer by copolymerization, e.g., maleic anhydride copolymerized with methyl vinyl ether, or the anionic groups may result from the use of acid producing polymerization catalysts, e.g., potassium persulfate sodium/bisulfite employed with acrylonitrile, or a sulfonate-containing organic peroxide or the groups may be incorporated by reaction on the finished polymer, e.g., the reaction of chlorosulfonic acid with a copolymer of styrene and acrylonitrile. Thus the anionic groups may be pendent along the molecular chain or may be present as end groups.

The following table lists the pK values of common acids for illustrative purpose. These materials can be considered to be model compounds for the acid groups in the various polymers.

pK of Common Acids in Aqueous Solutions (25°)

| Acid Moiety | Step | pK |
|---|---|---|
| Arsenic acid | 1 | 2.25 |
|  | 2 | 6.77 |
|  | 3 | 11.60 |
| Fumaric acid | 1 | 3.03 |
|  | 32 | 4.44 |
| Tricarboxy-2,3,4-but | 1 | 3,18 |
| 1-ene | 2 | 4.52 |
|  | 3 | 5.99 |
| Itaconic acid | 1 | 3.85 |
|  | 2 | 3.45 |
| Carbonic acid | 1 | 6.37 |
|  | 2 | 10.25 |
| Methacrylic acid | 1 | 3.66 |
| Acrylic acid | 1 | 4.25 |
| Phosphoric acid | 1 | 2.12 |
|  | 2 | 7.21 |
|  | 3 | 12.67 |
| Methyl phosphonic acid | 1 | 1.23 |
|  | 2 | 2.79 |
| Selenic acid | 2 | 1.92 |
| Sulfuric acid | 2 | 1.92 |
| Maleic acid (derived | 1 | 1.83 |
| from maleic anhydride | 2 | 6.07 |
| Benzenesulfonic acid | 1 | 0.70 |

Preferred components include: phosphonic acids, phosphinic acids, tricarboxy-2,3,4-but-1-ene acid, the organic acids from selenium, methyacrylic acid, acrylic acid, sulfonic acids, itaconic acid, maleic anhydride which yields maleic acid, and fumaric acid.

The following examples illustrate specific embodiments of the present invention.

EXAMPLE 1

This example shows the concentration, i.e., water removal from formaldehyde, using membranes of a copolymer of acrylonitrile (AN) and acrylic acid (AA), made according to the general procedure of Example 6.

The present example is directed to the concentration of formaldehyde via the permeable membrane. Formaldehyde concentration is determined by the quantity of NaOH liberated by reaction of HCHO with sodium sulfite (in excess) to form the formaldehyde-bisulfite addition product according to the equation:

$$HCHO\ (aq.) + Na_2SO_3 + H_2O \rightarrow NaOH + CH_2(NaSO_3)OH$$

The percentage of HCHO is calculated by the equation:

% Formaldehyde = (cc. HCl) (Normality HCl) (3.003)/wt. sample

The separation factor (S.F.) is defined as the ratio of the concentrations of the two substances A and B to be separated divided into the ratio of the concentrations of the corresponding substances in the permeate:

S.F. = $(c_A/c_B)$ in permeate/$(c_A/c_B)$ in permeant
where $c_A$ and $c_B$ are the concentrations of water and formaldehyde ($HNO_3$, HCl or ethanol, respectively).

A formalin solution containing 36.95% HCHO, 53% $H_2O$, 0.05% formic acid and 10% $CH_3OH$ is concentrated into a slurry containing 62% HCHO at room temperature. As shown in the following table, the separation factor increases from 30 for a 41.3 percent formaldehyde solution at the beginning of the permeation to 48 for a solution containing 62.0% HCHO. At such a high concentration, paraformaldehyde separates out as a solid and the permeation is terminated.

The formic acid is also selectively permeated (relative to formaldehyde) during this operation.

Permeation of Formaldehyde Solution through an 80:20 wt ratio AN:AA membrane (25°C)

| Period of permeation hrs. | Grams Permeate during time interval | Grams removed from feed cell | wt. % HCHO in feed cell | wt. % HCHO in permeat | S.F. |
|---|---|---|---|---|---|
| 16.5 | 1.394 | 0.06 | 37.0 | | |
| 24.1 | 0.861 | | 41.8 | 2.3 | 30 |
| 24.5 | 0.729 | | 42.2 | 1.2 | 60 |
| 22.3 | 0.533 | | | | |
| 71.1 | 0.934 | | 46.9 | | |
| 46.1 | 0.492 | | 49.6 | | |
| 23.4 | 0.359 | 0.383 | 50.5 | 2.68 | 37 |
| 46.5 | 0.478 | 0.214 | 53.9 | 3.22 | 35 |
| 72.0 | 0.72 (est) | 0.18 | 54.8 | | |
| | 0.183 | 0.17 | 56.5 | | |
| 27.0 | 0.282 | 0.27 | 59.0 | 2.89 | 48 |
| 24.1 | 0.231 | 0.132 | 62.7 | 3.9 | 42 |
| 42.3 | 0.301 | 0.187 | 62.0 | 3.4 | 46 |

EXAMPLES 2 to 5

Poly(vinyl butyral), which can be considered as a condensation product of polyvinyl alcohol and butyraldehyde, contains an acetal linkage. The acetal oxygen is hydrophilic and weakly anionic. The membrane prepared from poly(vinyl butyral) is also selective, giving a separation factor (S.F.) of 14-18 for formaldehyde solutions. The following table compares the separation factors obtained with various membrane for permeation of formaldehyde solutions.

Comparison of S.F.'s obtained for Formaldehyde Solutions with Various Membranes by Permeation

| Example | Membrane | S.F. |
|---|---|---|
| 2 | Cellulose acetate | 2-8 |
| 3 | Silicone polycarbonate (Tradenome M-2/3 by GE) | 3.0 |
| 4 | 84.4:15.6 AN:AA (by wt.) | 30-48 |
| 5 | Poly(vinyl butral) | 14-18 |

EXAMPLE 6

It has been found that the membranes prepared from copolymers of AN and AA which are already characterized by high selectivity, may be further improved as to permeability. The rate of permeation is remarkably improved by replacing the weaker anion (namely the acrylic acid with a pK=5) with stronger anionic groups, namely styrene sulfonic acid, (SSA) with a pK=1. Acrylic acid has a relatively low degree of ionization when compared to styrene sulfonic acid which is virtually completely ionized.

Membranes prepared from copolymers of AN and sodium styrene sulfonate (SSS) are prepared as follows.

The polymerization is carried out according to the procedure of "Macromolecular Synthesis," Volume 2, John Wiley, 1966, page 78. In this procedure acrylonitrile (36 g.) with 1.985 g. of sodium styrene sulfonate is dissolved in distilled water (0.4 liter) and charged to a reaction vessel having a reflux condenser. The flask is maintained at 50°C, under nitrogen pressure, while the catalyst is added (catalyst solution composed of 25 ml. of water, 4 ml. of 0.1 N sulfuric acid, and 0.001 g. of ferrous ammonium sulfate hexahydrate). There is also added a solution of 25 ml. of water containing 0.10 g. of potassium persulfate, and then 50 ml. of water containing 0.50 g. of sodium metabisulfite. The polymerization is continued for one hour during which time a slurry develops. The reaction is then stopped by the addition of a 1 percent solution of sodium carbonate to reach pH 7.0. The slurry is filtered, washed with water and acetone, and dried at 100°C.

The membranes are prepared by casting films from a 5 percent dimethyl sulfoxide (DMSO) solution of the polymer as described below, containing varying amounts of the acid group, on a glass plate heated on a steam bath. After drying 1 hour on the steam bath, the membrane is conditioned by immersion in water followed by treatment with the permeating solution in the cell at least a day prior to measurement. The thickness of the membrane in water varies from 1.0 to 1.2 mils.

The data below summarizes the results of concentrating formaldehyde-water using a copolymer of acrylonitrile and sodium styrene sulfonate.

Permeation of 37% Formalin Solutions with Membranes Containing Copolymers of AN and SS

| Mole % SSS | Temp. | S.F. |
|---|---|---|
| 0.54 | 25 | 39 |
| 0.54 | 50 | 40-80 |
| 1.27 | 25 | 17-23 |
| 1.27 | 50 | 37 |
| 3.44 | 25 | 20 |
| 3.44 | 50 | 13 |

The results obtained on the permeation of formaldehyde solutions with the AN-SSS membranes are given in Example 6. While the S.F. changes in a relatively minor way (in the range of 15 to 50), the permeation rate (not shown) increases with the concentration of the acid group as well as with the temperature.

EXAMPLE 7

The present example illustrates the separation method of this invention in which the separation a three-component system-water, methanol and formaldehyde is involved. The separation factors with respect to formaldehyde and methanol are given as follows:

Permeation of water, methanol and formaldehyde with the AN-SSS Membrane Containing 1.27 mole % of SSS

| Temp of Permeation | % HCHO in Permeant | % HCHO in Permeate | S.F. of water with respect to HCHO |
|---|---|---|---|
| 70 | 57.28 | 8.20 | 15.0 |
| 70 | 38.81 | 4.58 | 13.2 |

| Temp of permeation | % CH₃OH in Permeant | % HCHO in Permeate | S.F. of water with respect to CH₃OH |
|---|---|---|---|
| 70 | 31.17 | 9.43 | 5.3 |
| 70 | 11.20 | 3.00 | 4.1 |

The different separation factors obtained for HCHO and CH₂OH indicate clearly that the rate of permeation of H₂O, HCHO and CH₃OH can be arranged in the following order $$H_2O > CH_3OH > HCHO$$

Consequently the membrane can be used for the separation of $CH_3OH$ from other organic materials.

In the above examples, the sulfonate groups are incorporated into the membrane either by copolymerization of AN and SSS or by admixing a solution of PAN and a solution of copolymer of AN and SSS at the desired concentration. Apart from the slight difference in the rate of permeation, the separation factors obtained with these membranes are essentially the same. (See Example 18).

EXAMPLE 8

This example illustrates the fact that the copolymer containing the sulfonate groups can be prepared by the copolmerization of AN and sodium allylsulfonate (SAS) instead of SSS. The copolymer is prepared by solution polymerization following a procedure as described by K. Miyamichi, egc., Kobunshi Kagaku 21, 79–82 (1964) using a free radical catalyst and DMSO as a solvent. The results obtained are given in the following table Permeation of Formaldehyde Solutions with a Membrane Prepared from a Copolymer of AN and SAS containing 11.5 Mole % of SAS (25°C)

| Permeation Time, Hrs. | % HCHO IN Permeant | Permeate | S.F. |
|---|---|---|---|
| 2.25 | 38.25 | 2.57 | 28.6 |
| 1.00 | 38.91 | 2.53 | 24.6 |
| 1.75 | 39 | 2.69 | 28 |
| 1.50 | 41.66 | 2.33 | 29.9 |
| 2.75 tr 42 | | 3.18 | 22 |

The strong anionic group which is incorporated within the polymer does not have to be derived from a second monomer. It can be incorporated from the particular catalyst used. The polymer used to make the membrane as described in Example 6 has a large number (usually greater than 50 percent) of end groups which contain sulfur and act as anions (probably sulfonic acid groups). Only a small faction of the end groups need to contain anions.

EXAMPLE 9

Polyacrylonitrile homopolymer is produced as described using the procedure in the reference cited in Example 6 and used to permeate formalin at 25°. The separation factor is above 80. When polyacrylonitrile is obtained by the polymerization of acrylo-nitrile in dimethylsulfoxide using an azo-bis-isobutyro-nitrile catalyst, the separation factor is less than 30.

EXAMPLE 10

This example shows the concentration of formaldehyde at high temperatures and at high and low concentration in the feed cell.

A copolymer of acrylonitrile-sodium styrene sulfonate (1.3 mole percent) is used at 100°C with liquid on one side of the membrane (which contains 68 percent formaldehyde and 32 percent water) and a pressure of less than 0.1 mm on the collecting side of the membrane. The permeate contains 9.9 percent formaldehyde giving a separation factor of 20.

In another experiment a polyacrylonitrile copolymer is prepared as discussed above in Example 1. The cast polymer as a disc is held in contact with a liquid solution of 15 percent formaldehyde in water at 70°C. The vapor side is at a pressure of less than 0.1 mm Hg. The permeate contains 1.0 percent formaldehyde, giving a separation factor of 25. To accomplish a concentration by reverse osmosis (liquid phase to liquid phase) under these conditions would require pressures well in excess of 1,000 psi. With reverse osmosis the separation factor would be less than 2.

The present method of employing permeation for the concentration of formaldehyde solutions i.e., the removal of water, has a substantial advantage over the commercial distillation procedure. The distillation procedure requires holding the feed solution of formaldehyde-water (usually also in the presence of methanol) for long periods of time, and much formic acid is formed, thus contaminating the formaldehyde. In contradistinction, the present method operates with only the very slow formation of formic acid, with substantially no formic acid appearing in the permeate.

EXAMPLE 11

The following table shows other data on permeation of formaldehyde-water solutions through various membranes.

PERMEATION OF FORMATION AT 25°C (vapor side less than 0.1 mm Hg and feed side at one atmosphere)

| Polymer | Separation Factor |
|---|---|
| 1. Copolymer of acrylonitrile, styrene, and styrene phosphonic acid (by reaction of PCl₃ with copolymer) | 20 |
| 2. Copolymer of acrylonitrile and styrene (no anionic end groups present) | 5 |
| 3. Copolymer and acrylonitrile and styrene (anionic end groups present) | 80 |
| 4. Copolymer of acrylonitrile and ethyl vinyl ether (with and without anionic end groups present) | 80 |
| 5. Nylon 66 | 5 |
| 6. Copolymer of acrylonitrile and the trimethyl ester of 2,3,4-tricarboxylic acid but-1-ene | 25 |
| 7. Copolymer of acrylonitrile and 2,3,4-tri-carboxylic acid-but-1-ene | 40 |

8. Cyanoethylated cellulose (degree of substitution 2.5)    13

Permeation of formalin at 25°C thru physical blends of polymers (vapor side less than 0.1 mm Hg)

| Component A | | Component B | Separation Factor |
|---|---|---|---|
| Type Monomer | % by Wt. | | |
| copolymer of styrene and acrylonitrile | 80 | poly(vinylpyrollidone) | 14 |
| " | 80 | copolymer of maleic anhydride and methyl vinyl ether | >50 |
| " | 80 | copolymer of styrene and itaconic acid | >50 |
| " | 80 | copolymer of vinyl cyclohexene and maleic anhydride | >50 |
| " | 80 | copolymer of styrene and maleic anhydride | >50 |
| polyacrylonitrile | 85 | polyvinyl chloride | >50 |

EXAMPLE 12

While not bound by theory, the mode of operation of this invention appears to depend on the ability of water to be bound by hydrogen bonds and to form hydrogen bond. Thus, the sulfonic acid group has been reported to "absorb" as many as 15 molecules of water. Other hydrogen bonding material include the $$-\underset{|}{N}-$$

—NH—, —NH—NH—, and —NH$_2$ groups. Similarly oxygen, sulfur, phosphorus, selenium, and tellurium groups can be useful.

A 37 percent commercial formalin solution is kept in contact with a film of the polyterephthalamide of para-aminobenzhydrazide and a vacuum is maintained on the other side of the film. The permeate contains less than 0.5 percent formaldehyde and the separation factor was greater than 77. Similarly, other hydrazides are useful, e.g., the reaction product of terephthaloyl chloride with meta-phenylenediamine and hydrazine.

EXAMPLE 13

A mixture of polymers is made by dissolving 97 parts of polyacrylonitrile and 3 parts of polyethyleneimine in dimethyl formamide. A film is produced by casting the solution or glass and maintaining the wet film under vacuum for 8 hours at 35°C. When one side of the film is exposed to 37 percent formalin and the other side to a vacuum the permeate contains less than 0.43 percent formaldehyde and the separation factor is greater than 80.

EXAMPLE 14

Permeation of a 37 percent formalin solution at 25°C, thru a Nylon 66 film into a vacuum of less than 2 mm. results in a permeate containing 10 percent formaldehyde. The separation factor is 5 in this instance.

EXAMPLES 15 to 17

This example shows the concentration of nitric acid solution by removal of some of the water from dilute solution. The results on permeation of nitric acid with the AN-AA membrane are given as follows at 25°C:

| Example | Molar Ratio AN:AA | 11% HNO$_3$ by wt.-permeant | % HNO$_3$ by wt.-permeate | S.F. |
|---|---|---|---|---|
| 15 | 96.33.73 | 32.7 | 7.25 | 88.0 |
| 16 | 92.47.56 | 32.8 | 5.73 | 88.0 |
| 17 | 84.415.6 | 31.3 | 3.19 | 13.8 |

As seen in the table, the separation factors are quite high. The efficient separation is attributed to the high permeation rate of water relative to nitric acid through the membrane.

EXAMPLE 18

Permeation of Nitric Acid Solutions (32% by weight) with Membranes Prepared from Polyblends and Copolymers of AN and SSS at different concentration Levels (25°) Mole % SSS

| | | S.F. |
|---|---|---|
| A. Polyblends | 2.04 | |
| | 3.14 | 22-42 |
| | 4.35 | 21 |
| B. Copolymers | 0.54 | 18-20 |
| | 1.27 | 18 |
| | 3.44 | 17 |

EXAMPLE 19

Concentration of HCl solutions by Permeation [a]

| Time Interval Hrs. | % HCl by weight | | S.F. |
|---|---|---|---|
| | Permeant | Permeate | |
| 16.95 | 20.1 | 1.31 | 19.0 |
| 22.90 | 22.6 | 1.00 | 28.9 |
| 6.53 | 22.6 | 1.29 | 22.3 |
| 15.10 | 23.8 | 1.70 | 18.1 |
| 5.60 | | !1.68 | |
| 16.13 | 25.5 | 1.90 | 17.7 |
| 6.67 | 25.5 | 5.73 | 5.6 |
| 21.33 | 27.7 | 8.43 | 4.2 |
| 42.62 | 29.9 | 10.10 | 3.8 |
| 17.80 | 30.3 | 12.0 | 3.2 |

[a] The membrane used here is prepared from a polyblend of PAN and a copolymer of AN and SSS containing 4.35 mole % of SSS. The membrane is conditioned by immersion in a 30.6% HCl solution for two weeks prior to use.

EXAMPLE 20

Liquid-vapor permeation with the AN-SSS membrane is also carried out for dewatering of ethanol solutions covering the entire range of the concentration. The rate of permeation of pure water and that of ethanol can differ by a factor of about 100 in favor of water in the case of styrenesulfonic acid membranes. The separation factors at 25°C are 3.3, 12 and 86 at concentrations of 16 percent, 54 percent and 98 percent, respectively.

Permeation of Ethanol Solutions with an AN-SSS Copolymer Membrane Containing 3.44 mole % of SSS

| % EtOH by weight in Permeant | Permeate | S.F.* |
|---|---|---|
| 16.0 | 5.5 | 3.3 |
| 17.5 | 11.0 | 1.7 |
| 23.0 | 9.0 | 3.0 |
| n 28.0 | 10.8 | 3.2 |
| 32.0 | 8.6 | 5.0 |
| b 49.2 | 9.0 | 8.0 |
| 53.8 | 9.0 | 11.8 |
| 78.0 | 14.2 | 21.4 |
| 79.8 | 15.2 | 21.2 |
| 84.5 | 16.0 | 28.6 |
| 85.2 | 16.5 | 29.1 |
| 86/0 | 16.0 | 32.3 |
| 96.6 | 34.2 | 54.7 |
| 97.8 | 34.0 | 86.8 |

* Defined as $$\left(\frac{\%\text{H}_2\text{O}}{\%\text{EtOH}}\right)_{\text{permeate}} \bigg/ \left(\frac{\%\text{H}_2\text{O}}{\%\text{EtOH}}\right)_{\text{permeant}}$$

The separation of water from other azeotropic forming mixtures is also found to be readily accomplished with a good separation factor for liquids selected from the class consisting of acrolein, methacrylonitrile, acrylonitrile, vinyl acetate, pyridine, ethyl acrylate, acetonitrile, hydrocyanic acid, isopropanol, normal propanol, cyclohexanol, formic acid, acetic acid, butanol, acrylonitrile, propionic acid, methyl acetate, methyl acrylate, butyraldehyde, isobutyraldehyde, ethyl acetate, ethyl ether, furfuryl alcohol, methyl methacrylate, phenol, aniline, 2-ethylhexanol, cyclohexylamine, butyl acrylate, isooctyl alcohol, propionitrile, amyl alcohol, amyl acetate and ethyl alcohol.

EXAMPLE 21

The examples below show that the pressure on both sides of the membrane may be above or below atmospheric pressure.

A 70 percent by weight aqueous solution of acetaldehyde is allowed to permeate thru a polyacrylonitrile membrane containing one mole percent of sulfonic acid groups as sodium styrene sulfonate. The solution is held at 115°C (above 2,000 mm. of mercury pressure) and the other side of the membrane is held at 105°C (about 900 mm. of mercury pressure). The separation factor as previously defined was above 5.

The same feed solution is held at 115°C and the downstream side of the membrane is held at 85°C (about 450 mm. of mercury pressure). The separation factor is above 5.

EXAMPLE 22

A 3 percent by weight solution of maltol in water is allowed to permeate thru a 1 mil thick membrane composed os polyacrylonitrile with 0.1 percent sulfonic acid groups at 50°C. The second side of the membrane is kept at a pressure of less than 0.2 mm. of mercury. A condenser system is used to collect the permeate at −76°C. Water permeation preference is shown by the precipitation of the maltol from the solution as it becomes more concentrated.

In general, the membranes of the present invention are useful in separating water from the following amino acids and their derivatives: arginine, histidine, lysine, tyrosine, tryptophan, phenylalanine, cystine, methionine, threonine, serine, leucine, isoleucine, valine, glutamic acid, aspartic acid, glycine, alanine, proline, hydroxyproline.

EXAMPLE 23

A 6 percent by weight aqueous solution of Bacteria subtilus enzynes at pH 6–7 is concentrated to 60 percent by allowing permeation thur membrane of a copolymer of acrylonitrile and vinylpyridine at 35°C. The downstream side of the membrane is held at a pressure below 0.2 mm. of mercury. The pressure on the liquid side is atmospheric. If this same concentration were achieved via reverse osmosis, the pressure of the feed side would have to be greater than 400 psi.

EXAMPLE 24

A liquid containing 5.7 percent by weight of acrylonitrile in water at 45°C is kept under a total pressure (by pumping) of 32 psi, and permeation through a membrane composed of a polyurethane is allowed to occur. The polyurethane block polymer is composed of soft sections of polyethylene oxide dialcohol combined by means of hard sections of toluene disocyanate within the molecular chain. The vapor i.e., permeate side of the membrane is at atmospheric pressure swept by helium to lower the chemical potential of the diffusing species. The liquid in the feed cell becomes concentrated in acrylonitrile and a second phase of predominantly liquid acrylonitrile appears as the water is permeated preferen-tially into the receiving cell.

EXAMPLE 25

A 14 percent solution of formaldehyde in water at 70°C, 0.5 atmospheric pressure, is allowed to permeate through a membrane into a vacuum of 0.1 mm of mercury. The membrane is composed of a polymer made by reaching terephthaloyl chloride with the bis-o-aminobenzamide of o-phenylinediamine. The separation factor is 54, after heating the film dry at 130°C. ( In general such heat treatment is effective above 60°C and can be as high as 400°C in nitrogen for the present membrane as well as other polymers and copolymers). Untreated film gives a separation factor below 7 in the above example.

EXAMPLE 26

A membrane is made by copolymerizing acrylonitrile and vinylpyridine via free radical catalysis, and casting a thin film. The membrane is exposed to a solution of formalin at 25°C. The second side of the membrane is kept at 0.2 mm of mercury. The separation factor between formaldehyde and water is over 100.

EXAMPLE 27

A 4 percent by weight liquid solution of isopropanol-in-water at 25°C and 1.5 atm is allowed to permeate through a membrane, the pressure on the other side of which is 0.1 mm of mercury. The membrane is composed of a polymer made from the reaction product of terephthaloyl chloride, meta-phenylene diamine and hydrazine. The liquid feed solution is found to become more concentrated in isopropanol as water passes through the membrane preferentially.

EXAMPLE 28

A mixture of 50 percent ethanol and 50 percent methanol at 53°C is allowed to permeate through a membrane composed of a copolymer of methacrylonitrile-sodium styrene sulfonate (2 mole percent). The second side of the membrane is held at essentially zero pressure and a selective separation of the feed component is achieved as the methanol preferentially passes through the membrane.

What is claimed is:

1. Process for the separation of water from feed mixtures comprising water and formaldehyde which comprises contacting the aforesaid mixture against one side of a membrane, said membrane comprising a copolymer of acrylonitrile and styrene sulfonate, and withdrawing, at the second side, a vaporous mixture having a higher concentration of water than the aforesaid feed mixture, with the mixture at second side, being maintained at a lower chemical potential than the feed side.

2. Process as in claim 1 in which the feed mixture comprises water, formaldehyde and methanol.

3. Process for the separation of water from feed mixtures comprising water and formaldehyde which comprises contacting the aforesaid mixture against one side of a membrane, said membrane comprising a copolymer of acrylonitrile and styrene sulfonate, and withdrawing, at the second side, a vaporous mixture having a higher concentration of water than the aforesaid feed mixture, with the mixture at the second side being maintained at a pressure which is greater than atmospheric, but is less than the pressure at the feed side of the membrane.

4. Process for the separation of water from feed mixtures comprising water and formaldehyde which comprises contacting the aforesaid mixture against one side of a membrane, said membrane comprising a copolymer of acrylonitrile, and styrene sulfonate, and withdrawing, at the second side, a vaporous mixture having a higher concentration of water than the aforesaid feed mixture, with the mixture at the said second side being maintained at a pressure less than atmospheric, but less than the pressure at the side feed side.

5. Process for the separation of water from feed mixtures comprising water and formaldehyde which comprises contacting the aforesaid mixture against one side of a membrane, said membrane comprising a copolymer of acrylonitrile and styrene sulfonate, and withdrawing, at the second side, a vaporous mixture having a higher concentration of water than the aforesaid feed mixture, with the mixture at the second side being maintained at a pressure less than atmospheric, and the pressure at the side feed side being maintained at a pressure greater than atmospheric.

6. Process as in claim 5 in which the said second side is maintained at a vacuum of from 0.3 to 759 mm. Hg.

* * * * *

C-07-21-0167

PO-1050
(5/69)

UNITED STATES PATENT OFFICE
CERTIFICATE OF CORRECTION

Patent No. 3,750,735      Dated August 7, 1973

Inventor(s) Robert Chiang, Eli Perry

It is certified that error appears in the above-identified patent and that said Letters Patent are hereby corrected as shown below:

Column 2, line after line 9, "Butyraldehyde" omitted

Column 6, line 46, "32" should read --2--, see

Column 6, line 49, "3.45" should read --5.45--

Column 7, line 46, "0.06" should read --0.60--

Column 7, line 49, "0.934" should read --0.935--

Column 9, line 26, "$CH_2OH$" should read --$CH_3OH$--

Column 11, line 45, "or" should read --on--

Column 11, line 65, "11%" should read --%--

Column 11, line 67, "88.0" should read --6.2--

IN THE CLAIMS

Column 15, line 8, "side" feed side should read --said--feed side

Column 16, line 7, "side" feed side should read --said--feed side

Signed and sealed this 17th day of September 1974.

(SEAL)
Attest:

McCOY M. GIBSON JR.      C. MARSHALL DANN
Attesting Officer      Commissioner of Patents